Oct. 12, 1965 W. M. SACKINGER 3,212,017
PLURAL INPUT ELECTRON BEAM PARAMETRIC AMPLIFIER
Filed Feb. 18, 1963
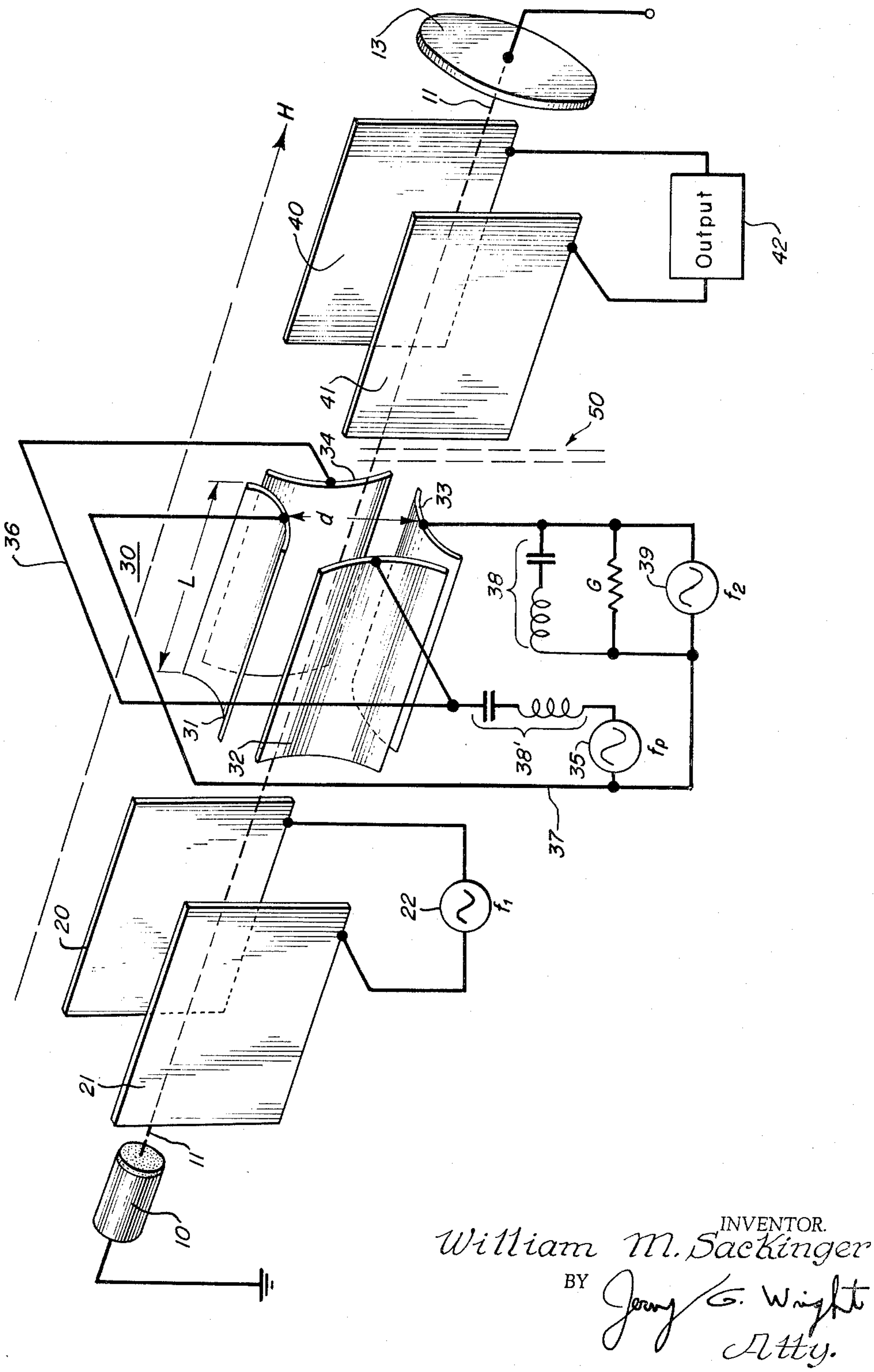
INVENTOR.
William M. Sackinger
BY Jerry G. Wright
Atty.

3,212,017
PLURAL INPUT ELECTRON BEAM PARAMETRIC AMPLIFIER

William M. Sackinger, Millport, N.Y., assignor to Zenith Radio Corporation, Chicago, Ill., a corporation of Delaware Filed Feb. 18, 1963, Ser. No. 259,256
4 Claims. (Cl. 330—4.7)

The present invention is directed to an electron beam parametric amplifier and concerns in particular an amplifier of the type having a plurality of signal inputs. The invention is a further development of the parametric amplifier described and claimed in Patent No. 3,059,138 issued to Glen Wade on October 16, 1962, and assigned to the same assignee as the present invention.

In a parametric amplifier of the type here disclosed, the electron beam is projected along a predetermined path which terminates in a collector for the beam. The electrons in the beam, when subjected to the restoring force of a focusing field, oscillate about their respective rest positions at a frequency referred to as the transverse resonant frequency or, for the usual case wherein the focusing results from a magnetic field, at the cyclotron frequency. The electron motion in a beam for which electron resonance has been established may be modified in response to an applied signal to effect modulation of the beam by that signal. Accordingly, it is the usual practice to position an input coupler along the beam path adjacent the electron source for the purpose of modulating the beam with a signal to be amplified.

Amplification is accomplished by expanding the electron motion representing the signal conveyed by the beam and this expansion is achieved by subjecting the signal-modulated beam to a non-homogeneous pumping field. The energy required for the amplification is delivered by a pump signal source which is connected to an appropriately-shaped electrode structure adjacent to the beam. For the quadrupole-type amplifier, the pumping field is created by a symmetrical quadrupole electrode structure as described in the afore-identified Wade patent.

After amplification in the modulation expander, the signal carried by the beam is extracted by means of an output coupler which, in the usual case, is the same type of structure which has been employed for modulating the beam with the signal to be amplified. In other words, the usual signal coupler has bi-directional properties; it is employed ahead of the modulation expander for the purpose of impressing a signal on the beam and is utilized after the expander to demodulate or extract the amplified signal from the beam.

Thus, as generally constructed, the quadrupole-type parametric amplifier has three distinct components positioned along the beam path, these being the input modulator or input coupler, the modulation expander, and the output demodulator or output coupler, arranged in the recited order. The above-identified Wade patent specifically discloses a combination of modulation expander and output coupler. This combined structure may be termed a "pumpler." The improvement of this invention features a modification of the pumpler which makes possible a plural input amplifier.

Moreover, it is desired effectively to cascade amplification and input stages, to allow for a plurality of different input signals. However inconsistent results would be obtained with present techniques because the first signal would be amplified more than the latter applied signal.

Accordingly, it is a general object of the present invention to provide an improved plural input electron beam parametric amplifier.

A primary aim of the invention is to enable cascaded parametic amplification of a plurality of signals, each being given the same gain.

It is another object of the invention to provide a plural input amplifying system having improved phase stability, unidirectional properties, and improved performance with low complexity.

An electron beam parametric amplifier constructed in accordance with the invention comprises means for producing a magnetic field along a predetermined axis and for projecting an electron beam along the same axis through a region within the magnetic field. Input signal coupling means is provided for producing on the electron beam a cyclotron rotational motion corresponding to a first signal from a first signal source. The rotational motion has a predetermined cyclotron frequency and a predetermined exit radius. A combined signal coupling and modulation expanding device is disposed astride the beam downstream from the input coupling means and produces a rotating quadrupolar field component. The device presents a load conductance, to those electrons of the beam which are rotating substantially in phase with the purely tangential component of the rotating quadrupolar field, of a value to maintain the cyclotron rotational motion of such electrons at the predetermined exit radius. A second signal from a second signal source is concurrently coupled to the beam in the form of additional cyclotron motion which is superimposed on the cyclotron rotational motion corresponding to the first signal, the superimposed second signal being concurrently amplified exponentially by the combined device. A third coupler is provided for detecting the combined first and second signals.

The invention may also be expressed from another aspect as apparatus for amplifying electric waves according to the parametric principle. The apparatus comprises means for projecting an electron beam along a predetermined path and for imparting to electrons in the beam a first transverse motion representative of a first intelligence signal. A second transverse motion representative of a second intelligence signal is also imparted to the electrons in the beam. These electrons are subjected to a restoring-force field which produces periodic electron motion corresponding to the first and second signal and to the field. Means are also provided for adding, concurrently with the impartation of the second motion, a transverse periodic non-homogeneous restoring-force field component to the restoring-force field, the component having a phase relationship with the above motions to deliver energy to components thereof in linear proportion to the amplitude of the components. Concurrently with the impartation of the second motion, energy, which was delivered to the first motion component, is extracted and dissipated in a resistive load. Finally, an output signal is derived from the resulting electron motions.

The features of the present invention which are believed to be novel are set forth with particularity in the appended claims. The invention, together with further objects and advantages thereof, may best be understood by reference to the following description taken in connection with the accompanying drawing in which the single figure is a schematic representation of a parametric amplifier embodying the present invention.

The theory of operation and structural details of a quadrupole type parametric amplifier are fully described in copending application Serial No. 747,764, now abandoned, filed July 10, 1958, in the name of Glen Wade and assigned to the assignee of the present invention, and also are described and claimed in copending application Serial No. 289,792 filed June 20, 1963, in the same name and assigned the same, the former having been abandoned expressly in favor of the latter continuation. Such devices by now have been in public use and are well understood by persons in this art. The function of the quadrupole field in achieving amplification is utilized by the modulation expander to be described herein. Moreover, the representative structural arrangement of a quadrupole type parametric amplifier disclosed in the earlier case are generally applicable in constructing physical embodiments of the device to be described. Accordingly, the representations of the figure annexed hereto are schematic and the structural description as well as the mode of operation will be discussed in much less detail in this text than in the Wade application.

Referring now more particularly to the single figure, the amplifying system there represented comprises an electron source 10 for projecting an electron beam along a predetermined path designated by construction line 11, 11. The electron source may be entirely conventional and preferably includes the usual cathode together with suitable accelerating electrodes for developing a well defined beam or stream of electrons. Path 11 terminates on electron collector or anode 13 disposed transversely of the path.

Means for imparting to electrons in beam 11, 11 a transverse motion representative of a first intelligence signal, $f_1$, include a pair of "Cuccia" coupler plates 20 and 21. The first intelligence signal is fed to the Cuccia coupler from a signal source 22. A longitudinal magnetic field, designated by an arrow labeled H, is produced along beam path 11, 11 by a solenoid (not shown). This magnetic field produces a restoring-force field which in conjunction with a signal from source 22 produces cyclotron rotational motion of the electrons. The cyclotron frequency of this motion is determined by the strength of the magnetic field H and the motion radius is determined predominantly by the magnitude of intelligence signal $f_1$. Upon leaving coupler 20, 21, each individual orbiting electron retains its exit radius throughout the drift space between the coupler and the next component.

Following input coupler 20, 21 is a single structure <u>30</u> serving as a combined signal coupler and modulation expander, which may be termed a pumpler. It comprises four inwardly curved plates 31–34 disposed coaxially of beam path 11 arranged in two mutually perpendicular pairs 31, 33 and 32, 34. This structure is likewise positioned within the magnetic field H.

The above structure performs the function of modulation expansion by producing a transverse periodic nonhomogeneous restoring-force field component which is algebraically additive to magnetic field H. The quadrupole field is produced by energy from a pump signal source 35 of a frequency $f_p$. As shown, one side of source 35 is coupled to plate 31 and, through a series resonant circuit 38, to plate 33. The other side of source 35 is coupled, through series resonant circuit 38', in parallel to plates 32 and 34. Series resonant circuits 38 and 38' exhibit a minimum impedance at the pump frequency $f_p$.

With a quadrupole field, the maximum tangential accelerating force is exerted on an electron when it is in phase with the maximum gain axis. With this phase relationship, termed the $r^+$ mode, maximum exponential expansion of the electron orbit takes place. Energy is thereby delivered to the orbiting electron by means of an increase in its radius of rotation and in linear proportion to its initial radius. On the other hand, the $r^-$ mode denotes the phase relationship between the rotating electron and the quadrupole or "pump" field in which a maximum tangential decelerating force acts on an orbiting electron to exponentially decrease its radius. This is more fully discussed in the Wade application.

A signal source 39 of a frequency $f_2$ is also coupled across plates 31, 33. The load conductance seen by plates 31, 33 is represented as a lumped conductance designated G which is placed in parallel with signal source 39. At the frequency $f_2$, plates 32 and 34 are isolated from conductance G by the open circuit condition of circuit 38'.

Similarly, network 38 represents an open circuit at frequency $f_2$.

Following the combined signal coupler and modulation expander 30 is a third coupler composed of plates 40 and 41 which remove or detect the combined first and second signals $f_1$ and $f_2$ which are transmitted to an output 42.

Dashed lines 50 indicate that several additional "pumplers" <u>30</u> would normally be used, as will be explained below.

*Operation*

The novelty of the present invention resides in the "pumpler" structure <u>30</u> and, more specifically, in the adjustment of the value of load conductance G. From a broad standpoint, the purpose of the structure is to provide a parametric amplifier with plural inputs and to insure that, while one signal such as $f_2$ is being added to the beam, a signal such as $f_1$ which was previously placed on the electron beam is not affected by the addition of the second signal or by its amplification. From an ideal standpoint, signal $f_1$ should be unaffected as to gain by its passage through device <u>30</u>. If device <u>30</u> acted only as a quadrupole, signal $f_1$ would be amplified by the modulation expansion action of the quadrupole. If, on the other hand, device <u>30</u> acted only as a coupler loaded by a conductance G, signal $f_1$ would be attenuated. In accordance with the present invention, the conductance G and the intensity of the quadrupole pump field are balanced so that the amplitude of signal $f_1$ remains unchanged.

To illustrate, a value of G will be computed for the one specific case in which an electron in beam path 11 is rotating in phase with the maximum gain axis of the quadrupole field of the pump structure. The two axes of maximum gain and maximum attenuation, as discussed above, may be designated with superscripts of plus and minus respectively. For the special case to be described the plus superscript will be emphasized.

The following is a mathematical derivation of that value of load conductance G of pumpler structure <u>30</u> which is necessary to meet the specific requirements set out above.

In Cuccia coupler structure 31, 33, the radius $r$ of an electron orbit varies as a function of Z, the distance along the beam path, in accordance with $$\frac{dr}{dZ}=K \qquad (1)$$

where K is a constant. In a quadrupolar field the variation of $r$ and Z is given by the solution to $$\frac{dr^{\pm}}{dZ}=\pm\alpha r \qquad (2)$$

where $\alpha$ is the well known gain constant of a quadrupole. The action of a composite pumpler structure on an orbiting electron is described by a superposition of Equations 1 and 2, which is $$\frac{dr^{\pm}}{dZ}=\pm\alpha r^{\pm}+K \qquad (3)$$

Solving for $r^{\pm}$ yields $$r^{\pm}=Ae^{\pm\alpha Z}\pm\frac{K}{\alpha} \qquad (4)$$

where A is a constant determined from boundary conditions. A boundary condition at the entrance to composite structure <u>30</u>, where Z is equal to 0, is $$r^{\pm}=r_o^{\pm} \qquad (4a)$$

where $r_o$ is, in this instance, the exit radius from the input coupler. Substituting this boundary condition into Equation 4 gives $$A=r_o^{\pm}\mp\frac{K}{\alpha} \qquad (5)$$

or $$A=r_o^{\pm}+C^{\pm} \qquad (5a)$$

where by definition $$C^{\pm}=\mp\frac{K}{\alpha}$$

Substituting Equation 5 into Equation 4, $$r^{\pm}=(r_o^{\pm}+C^{\pm})e^{\pm\alpha Z}+C^{\mp} \quad (6)$$

For preferred operation in which we are dealing only with the maximum tangential amplification axis, only the upper sign applies, and we wish to specify that $$r^{+}=r_o^{+} \quad (6a)$$

for all values of Z. From (6), this is only possible when $$r_o^{+}=-C^{+} \quad (7)$$

The current induced in the coupler circuit which is connected to plates 31, 33 is, from Ramo's theorem, proportional to the integral of the beam envelope. For both + and − modes, $$I^{\pm}=K'\int_0^L r^{\pm}(Z)dZ \quad (8)$$

where L is the length of the coupler and K' is a constant. Substituting Equation 6 into 8 and integrating yields $$I^{\pm}=-\frac{K'C^{\pm}}{\alpha}\left[\alpha L+\left(1+\frac{r_o^{\pm}}{C^{\pm}}\right)\left(e^{\pm\alpha L}-1\right)\right] \quad (9)$$

For the special case of Equation 7, $$I^{+}=-\frac{K'}{\alpha}C^{+}\alpha L \quad (10)$$

But, since $$C^{\pm}=\mp\frac{K}{\alpha}$$

we have $$I^{+}=\frac{K'KL}{\alpha} \quad (11)$$

But, it is well known, from simple Cuccia coupler analysis, that the beam deflection in a Cuccia coupler is proportional to the voltage; that is, $$K=A'V_t \quad (12)$$

where $V_t$ is the terminal voltage of the coupler. Substituting (12) into (11) gives $$I^{+}=\frac{K'A'V_tL}{\alpha} \quad (13)$$

and for an ordinary Cuccia coupler it can easily be proved that $$K'A'=\frac{I_o}{4V_od^2} \quad (14)$$

where $I_o$ is beam current and $V_o$ is beam voltage. Substituting Equation 14 into 13 we get $$I^{+}=\frac{I_o}{4V_od^2}\left(\frac{V_tL}{\alpha}\right) \quad (15)$$

rearranging, $$\frac{I^{+}}{V_t}=\frac{1}{4}\frac{I_o}{V_o}\frac{L^2}{d^2}\frac{1}{\alpha L}=G^{+} \quad (16)$$

In summary, a conductance of the above value as expressed in Equation 16 will present a predetermined resistive load to those electrons of the beam which are essentially in phase with the purely tangential accelerating component, or maximum gain component, of the rotating quadropolar field, such that the cyclotron rotational motion due to the signal $f_1$ is maintained at its initial entrance radius $r_0^{+}$ throughout the pumpler structure 30.

Concurrently with the maintenance of motion due to $f_1$, signal $f_2$ from source 39 is coupled to beam 11 in the form of additional cyclotron motion which is superimposed on the cyclotron motion corresponding to $f_1$. This added motion is amplified exponentially by the quadrupolar field in accordance with Equation 6 above, where the initial radius $r_o$ (corresponding to initial beam motion from $f_2$) is zero.

As is seen from Equation 6, the component of electron rotational motion due to source $f_2$ will start at zero radius at the pumpler entrance plane and will increase exponentially with distance through the pumpler. This beam motion will be linearly superimposed upon that motion due to $f_1$, previously specified. Since the external load conductance G (which is the output conductance of source $f_2$) is fixed by the previous requirement, the source $f_2$ will not be matched to the equivalent conductance presented by the beam to the signal $f_2$. Nevertheless, sufficient signal $f_2$ will be transferred to the beam and will be exponentially amplified.

According to the special case of the above derivation, the predetermined load conductance will only maintain the cyclotron motion of those electrons which are in the $r^{+}$ mode, which is the axis of maximum tangential acceleration of the quadrupolar field. In the case of electrons in the opposite or $r^{-}$ mode, which is the axis of maximum tangential deceleration, it can easily be shown in accordance with the above derivation that with an $\alpha$L value of the order of three, a typical value, the orbital radius of these electrons will be reduced to an insignificant amount so as not to cause any undesirable side effects. Those electrons whose orbital motion have a phase intermediate the two extreme modes discussed above will be affected in a manner intermediate the two extreme orbits analyzed above.

From a practical point of view, the present invention finds a very useful application in a phased array radar system. In such a system a plurality of radar antennas each receive separate information signals, each in turn having a specific phase. Each signal is then amplified and sent to a common point, the signals then being combined to provide the proper informational output. The relative phases of the signals at the antennas vary with the angle between the antenna array and the returning electromagnetic wave, and position information is derived by comparison of the phases of these signals. Each signal from an antenna must therefore be amplified a predetermined amount which is substantially identical to the amplification of every other input signal, and each amplifying channel must have identical phase characteristics in order that when the signals are combined the resultant signal will be an accurate representation of the phase relation of the signals at the antennas. Only then will the direction of the returning radar signal be determinable.

The present invention can be used to particular advantage in such an application as an amplifying and combining device. Each signal channel can be attached to a pumpler structure, and its phase and amplitude information will be amplified and superimposed on the beam which is carrying all the different signal inputs previously put onto the beam in the same fashion. In passing through a subsequent pumpler, this composite information is not affected, because of the unique choice of load conductance. Equal amplification in each channel is readily achieved by equal pumping strength, equal lengths, and equal load conductances for each pumpler. Equal phase characteristics for each channel are assured by the use of a common magnetic field, beam, and pump frequency.

The dashed lines 50 shown in the drawing indicate the subsequent pumpler structures which would be needed with a phased array radar system with many antennas. In such a system, the initial Cuccia coupler 20, 21 would be used only in conjunction with a modulation expander in order to amplify the signal $f_1$ the same amount as the signal $f_2$.

A plural input parametric amplifier as described above provides improved system phase stability since all inputs are both combined and amplified in a single structure. Furthermore, since an electron beam device of this type is essentially unidirectional, system stability and flexibility is enhanced.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Apparatus for amplifying electron waves according to the parametric principle comprising:

means for projecting an electron beam along a predetermined path;

means for imparting to electrons in said beam a first transverse motion representative of a first intelligence signal;

means for imparting to electrons in said beam a second transverse motion representative of a second intelligence signal;

means for subjecting said electrons to a restoring-force field producing periodic electron motion corresponding to said signals and to said field;

means for adding, concurrently with impartation of said second motion, to said restoring-force field a transverse periodic nonhomogeneous restoring-force field component having a phase relationship with said motions to deliver energy to components thereof in linear proportion to the amplitude of said components;

means for extracting, concurrently with impartation of said second motion, said energy delivered to the component of said first motion and dissipating said energy in a resistive load;

and means for deriving an output signal from the resulting electron motions.

2. Apparatus for amplifying electron waves according to the parametric principle comprising:

means for projecting an electron beam along a predetermined path;

means for imparting to electrons in said beam a first transverse motion representative of a first intelligence signal;

means for imparting to electrons in said beam a second transverse motion representative of a second intelligence signal;

means for subjecting said electrons to a restoring-force field producing periodic electron motion corresponding to said signals and to said field;

means for adding, concurrently with impartation of said second motion, to said restoring-force field a transverse periodic nonhomogeneous restoring-force field component having a phase relationship with said motions to deliver energy to components thereof in linear proportion to the amplitude of said components;

means for extracting, concurrently with impartation of said second motion, at least a portion of said energy delivered to the component of said first motion and dissipating said energy in a resistive load;

and means for deriving an output signal from the resulting electron motions.

3. A plural input electron beam parametric amplifier comprising:

means for producing a magnetic field along a predetermined axis;

means for projecting an electron beam along said predetermined axis through a region within said magnetic field;

input signal coupling means for producing on said electron beam cyclotron rotational motion corresponding to a first signal from a first signal source, said rotational motion having a predetermined cyclotron frequency and a predetermined exit radius;

a combined signal coupling and modulation expanding device disposed astride said beam and producing a rotating quadrupolar field component, said device presenting a load conductance, to those electrons of said beam which are substantially in phase with the purely tangential component of said rotating quadrupolar field, which has a value to maintain said cyclotron rotational motion of such electrons at said exit radius and concurrently coupling a second signal from a second signal source to said beam in the form of additional cyclotron motion which is superimposed on said cyclotron rotational motion corresponding to said first signal, said superimposed second signal being concurrently amplified exponentially by said combined device;

and a third coupler for detecting said combined first and second signals.

4. A plural input electron beam parametric amplifier comprising:

means for producing a magnetic field along a predetermined axis;

means for projecting an electron beam along said predetermined axis through a region within said magnetic field;

a first combined signal coupling and modulation expanding device disposed astride said beam for producing on said electron beam cyclotron rotational motion corresponding to a first signal from a first signal source, and for exponentially expanding said motion, said motion having a predetermined cyclotron frequency and a predetermined exit radius;

a second combined signal coupling and modulation expanding device disposed astride said beam and producing a rotating quadrupolar field component, said device presenting a load conductance, to those electrons of said beam which are substantially in phase with the purely tangential component of said rotating quadrupolar field, which has a value to maintain said cyclotron rotational motion of such electrons at said exit radius, and concurrently coupling a second signal from a second signal source to said beam in the form of additional cyclotron motion which is superimposed on said cyclotron rotational motion corresponding to said first signal, said superimposed second signal being concurrently amplified exponentially by said combined device;

and a third coupler for detecting said combined first and second signals.

No references cited.

ROY LAKE, *Primary Examiner.*